United States Patent [19]

Mori et al.

[11] Patent Number: 5,416,905
[45] Date of Patent: May 16, 1995

[54] METHOD OF PROGRAM MANAGEMENT FOR MULTIPLE COMPUTER SYSTEM

[75] Inventors: Kinji Mori, Yokohama; Shoji Miyamoto, Kawasaki; Koichi Haruna, Yokohama, all of Japan

[73] Assignee: Hitachi, Ltd., Tokyo, Japan

[21] Appl. No.: 979,433

[22] Filed: Nov. 20, 1992

Related U.S. Application Data

[63] Continuation of Ser. No. 585,026, Sep. 19, 1990, abandoned, which is a continuation of Ser. No. 869,982, Jun. 3, 1986, abandoned.

[30] Foreign Application Priority Data

Jun. 12, 1985 [JP] Japan ............... 60-126152

[51] Int. Cl.$^6$ ............................... G06F 15/16
[52] U.S. Cl. ..................... 395/200; 364/931.4; 364/230.6
[58] Field of Search ........... 340/825.05; 395/200

[56] References Cited

U.S. PATENT DOCUMENTS

| | | | |
|---|---|---|---|
| 4,183,086 | 1/1980 | Kober ............................. | 364/200 |
| 4,366,479 | 12/1982 | Mori et al. ..................... | 340/825.05 |
| 4,430,728 | 2/1984 | Beitel et al. ................... | 364/900 |
| 4,454,600 | 6/1984 | LeGresley ...................... | 371/25 |
| 4,462,075 | 7/1984 | Mori et al. ..................... | 364/200 |
| 4,477,881 | 10/1984 | Kobayashi et al. ............. | 364/900 |
| 4,521,846 | 6/1985 | Scalzi et al. ................... | 364/200 |
| 4,627,055 | 12/1986 | Mori et al. ..................... | 364/200 |
| 4,648,061 | 3/1987 | Foster ............................. | 364/900 |
| 4,652,990 | 3/1987 | Pailen ............................. | 364/200 |
| 4,698,629 | 10/1987 | Mori et al. ..................... | 364/478 |
| 4,763,254 | 8/1988 | Mori et al. ..................... | 364/200 |

OTHER PUBLICATIONS

Donovan "Operating System" 1974, McGraw-Hill, pp. 105–116.

Primary Examiner—David Y. Eng
Attorney, Agent, or Firm—Antonelli, Terry, Stout & Kraus

[57] ABSTRACT

In a multiple computer system, a computer sends a program annexed with a code representative of the characteristic (e.g., the content and length of the program, the cooperation with other programs, the content of input and output data) of the program to the transmission line. Another computer checks the program based on the code representative of the program characteristic, and receives the program if necessary or executable based on the check result. Each computer can set, as occasion arises or if necessary, codes representative of the characteristics of several programs executable by the computer, so that specific receiving stations are not needed to be identified beforehand. The received program is checked based on the characteristic code annexed thereto, and if proper, the program is stored or executed if necessary.

35 Claims, 4 Drawing Sheets

METHOD OF PROGRAM MANAGEMENT FOR MULTIPLE COMPUTER SYSTEM

This application is a continuation of application Ser. No. 585,026, filed Sep. 19, 1990, now abandoned which is a Continuation of application Ser. No. 869,982, filed Jun. 3, 1986, now abandoned.

BACKGROUND OF THE INVENTION

The present invention relates to a multiple computer system having a plurality of computers, intelligent terminals, work stations and the like interconnected via a transmission line, and more particularly to autonomous and distributed processing in such a system.

In conventional multiple computer systems (e.g., disclosed in "Multiple Microprocessor Systems: What, Why, and When". Computer, IEEE Vol. 16, No. 3, March 1983, PP. 23 to 32), each computer stores programs to be executed, or a predetermined specific computer transfers programs by a certain procedure such as remote loading, to another computer which executes the programs. In such a system, timely program loading may not always be attained every time a computer requests programs, or the transfer of programs between computers may not always be attained as desired. Thus, the prior system are not flexible enough to deal with the load status of the computers, the occurrence of failures in the network, the addition of computers to the network, or the removal of computers from the network. In addition having a specific computer control the programs of a large network, is difficult.

SUMMARY OF THE INVENTION

An object of the present invention is to provide a multiple computer system capable of transferring programs between computers at any time as occasion arises, thereby improving the total processing capability of the system, attaining the transparency among computers for utilizing newly developed programs resident in one or more of the computers, enhancing the capability of the system to handle failures, and facilitating expansion, reduction and maintenance of the system.

To achieve the above object of the invention, in a multiple computer system having a plurality of computers interconnected via a transmission line, each having a processor and at least a memory for storing programs, a method of program management is provided which comprises the steps of sending from a computer a program together with a characteristic code representing the characteristic of said program onto said transmission line, and receiving at other computers said delivered program if said other computers decide to receive said delivered program judging from said characteristic code annexed to said delivered program.

DESCRIPTION OF THE PREFERRED EMBODIMENTS

Figure 2:
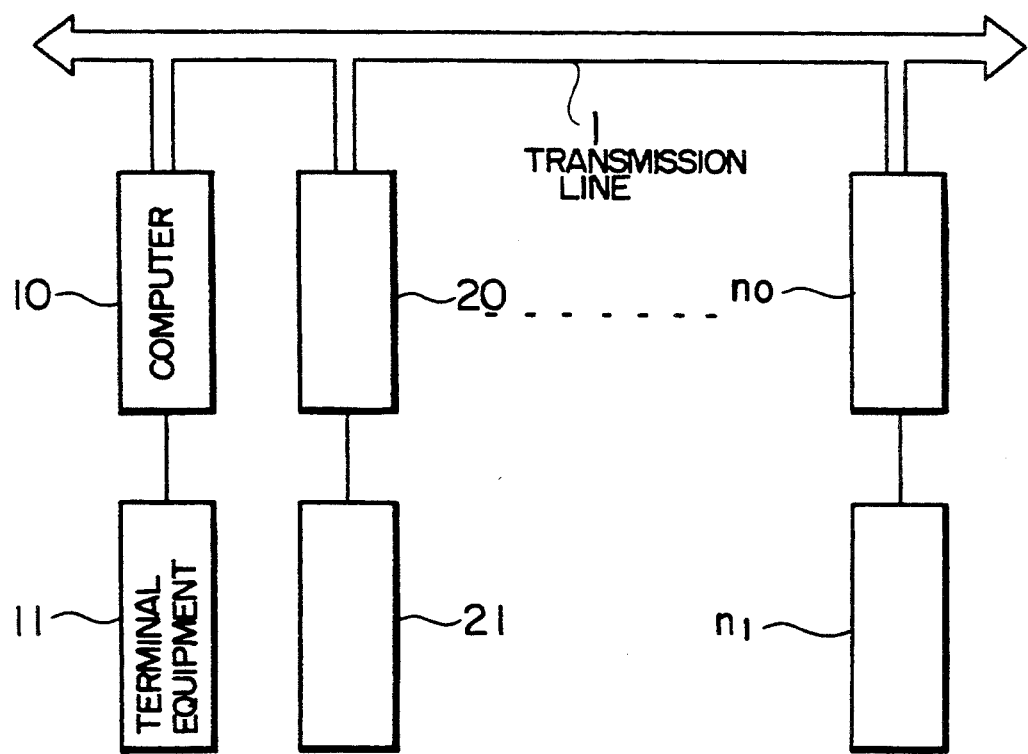
FIG. 2 is a block diagram showing the overall construction of a multiple computer system applied to the present invention.

FIG. 2 shows an example of the overall construction of a multiple computer system applied to the present invention. Computers 10, 20, ... n0 are interconnected via a transmission line 1 for sending or receiving data and programs. Each computer includes a processor and a memory for storing data and programs and is connected to terminal equipments 11, 21, ... n1.

Figure 3:
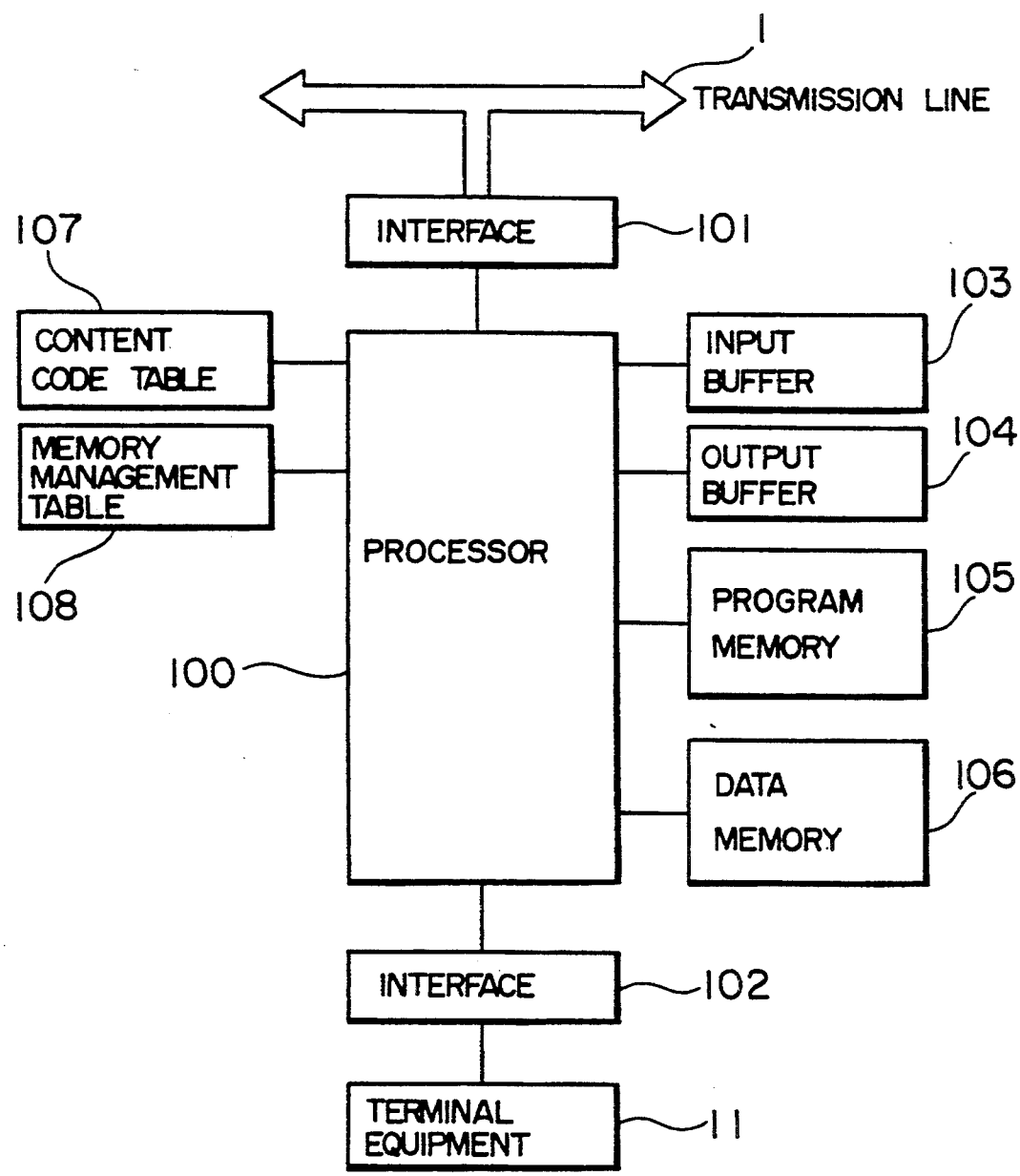
FIG. 3 is a block diagram showing one of the computers of the system of FIG. 2.

The construction of each computer, e.g., computer 10, is shown in FIG. 3. A processor 100 is connected to the transmission line 1 via an interface 101 and to the terminal equipment 11 via an interface 102. The processor 100 is also connected to an input buffer 103, an output buffer 104, a program memory 105, a data memory 106, a content code table 107, and a memory management table 108. Codes are set beforehand in the content code table 107 by proper methods, such as manual input by the operator through the terminal equipment 11 or through a control computer. The codes represent the contents (the subject to be processed, the purpose, format and so on, e.g., calculation of the delay in time schedule of trains, or calculation of particular functions) of several programs executable by the computer. The memory management table 108 retains information indicating the empty state of the program memory 105, the content of information being updated by the processor 100 in response to a storage of programs in the program memory 105, a deletion of old programs, a modification of programs or the like.

Assume that a new program has been stored in the program memory 105 of the computer 10. This program may be a program developed by the operator using the terminal equipment, a program developed at another station and loaded to the computer 10, or a program in the form of a built-in ROM. It is noted however that a program content code and a control code to be described later must be produced and annexed to the program. Upon request from the operator at a proper timing, upon transfer request of the program from another computer, or upon request of running the program, the processor 100 transfers a copy of the program to the output buffer 104 and to the transmission line 1 via the interface 101, at a predetermined message deliver timing.

Figure 1:
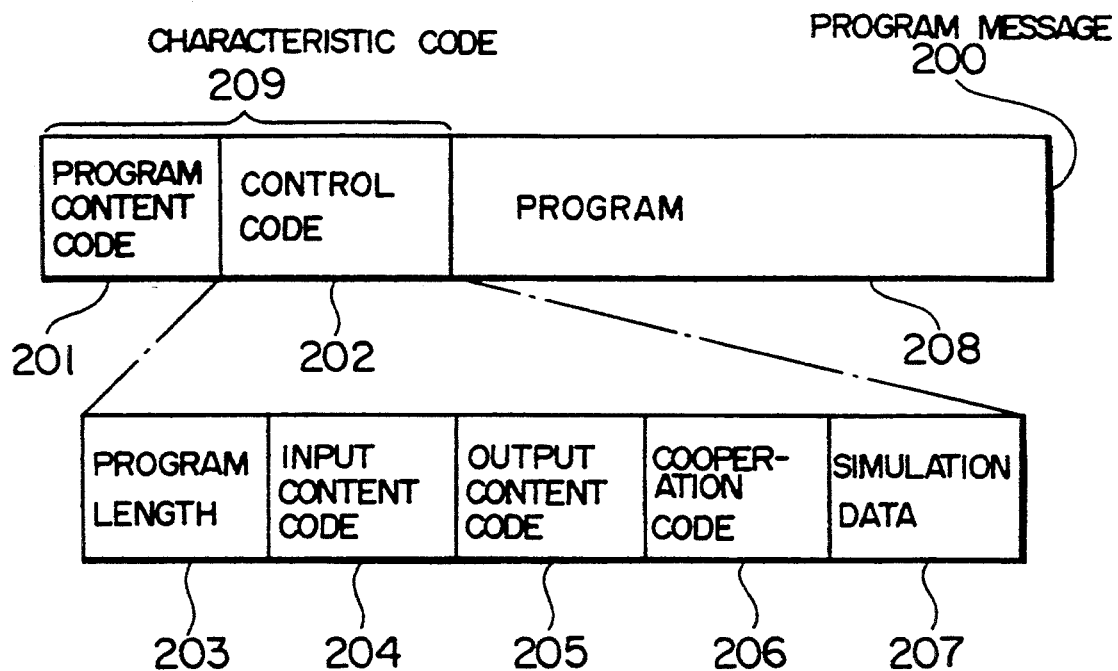
FIG. 1 shows a program message format used in an embodiment of the present invention.

The program to be delivered is edited to a program message 200 of a format as shown in FIG. 1. The program message 200 is constructed of the program itself 208 and a characteristic code 209 representing the characteristic necessary for management of the program. The characteristic code 209 is constructed of a program content code 201 and a control code 202. The program content code 201 corresponds to the content of the content code table 107 provided at each computer, and represents the content of the program, e.g., represents that the program 208 is for calculating a delay in time schedule of trains for train running management. The control code 202 is constructed of: a program length 203 indicating the program length; an input content code 204 representing the content (e.g., arrival time of trains) of input data which constitutes one of the conditions for running the program; an output content code 205 representing the content (e.g., delay time, train running instruction) of data obtained as the result of executing the program; a cooperation code 206 indicating which kind of cooperation (e.g., synchronization in execution, matching with received data which is output from different computers) with other programs to be executed by other computers is to be incorporated; and simulation data 207 constructed of simulation input data and output data to be obtained upon simulation. The simulation data 207 may be included as part of the program 208.

As the program message flows on the transmission line 1, each of the remaining computers takes it in the input buffer 103 via the interface 101. Each processor 100 checks the program content code 201 of the received program message by referring to the content code table and judging if the content of the program is available. In addition, the processor 100 compares the program length code 203 with the content of the memory management table 108 to judge if the program memory 105 has a space sufficient for storing the program. If the program is decided to be stored based on the above two judgements, the program is transferred from the input buffer 103 to the program memory 105 and stored at the vacant area thereof indicated by the memory management table 108 which is updated at the same time to indicate a new space of the memory. Alternatively, if one of the two judgements is negative, the content of the input buffer is immediately cleared.

When the new program is stored in the program memory 105, the processor 100 then checks the program in such a way that the program is executed using the simulation input data in the simulation data 207 and the obtained data is compared with the output data in the simulation data 207. If the obtained data is not identical with the output data, the program is judged as having a fault and is deleted from the program memory. A message to such effect is delivered to the transmission line 1 or displayed on the terminal equipment 11, and the previous content of the memory management table 108 is restored. However, if identical, the program is judged as having no fault and the following procedure starts.

Figure 4:
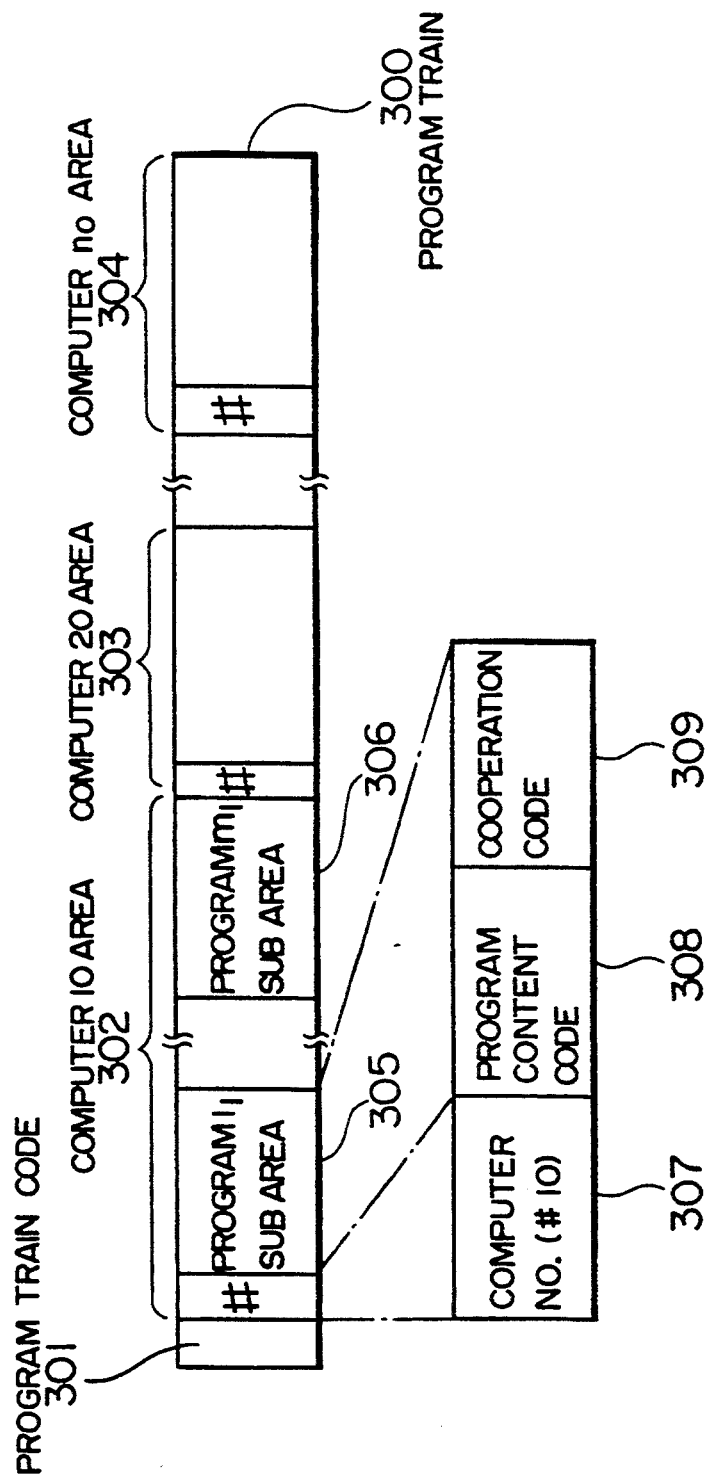
FIG. 4 shows a program train format.

Upon a judgement that the program has no fault, a program train 300 as shown in FIG. 4 is formed to check if the program contradicts other programs stored in the remaining computers. Next, the processor 100 of the computer 10, having stored a new correct program from another computer, collects program content codes 201 and cooperation codes 206 of programs $1_1$ to $m_1$ in the program memory 105 to thereby form a series of program sub areas 305 to 306 constructed of a program content code 308 and a cooperation code 309. A computer identification number 307 is annexed to the series of the program sub areas to form a computer 10 area 302. Further, at the top of the computer 10 area 302, a program train code 301 indicative of a program train is annexed for delivery to the transmission line 1.

Figure 5:
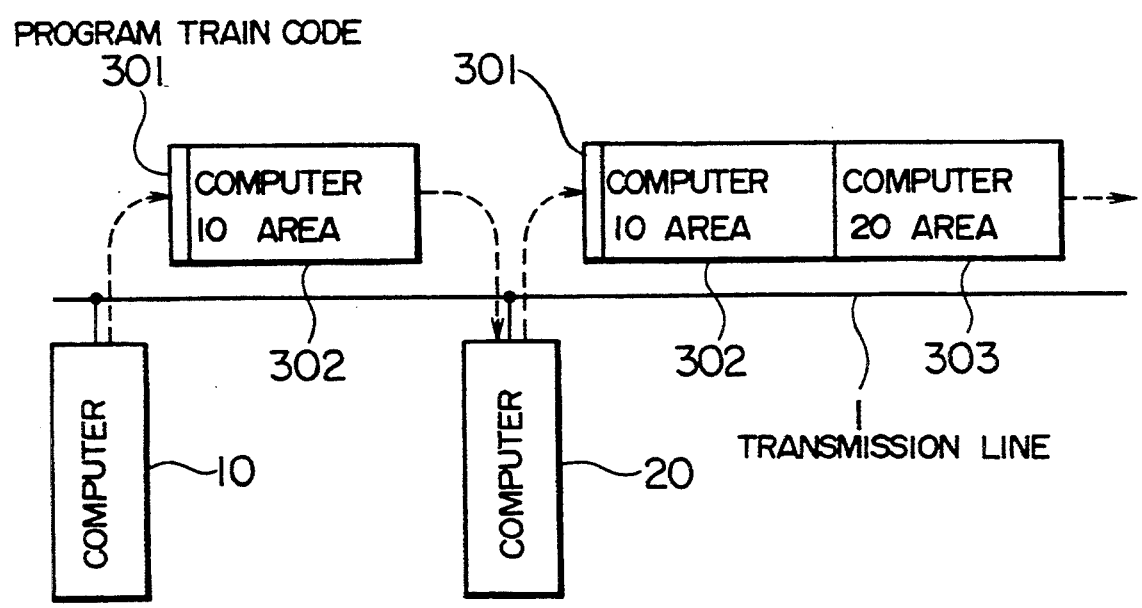
FIG. 5 schematically shows how a program train is formed.

The computer 20 detects the program train delivered from the computer 10 and forms a computer 20 area 303, in a similar manner as above, based on the program content codes and the cooperation codes of the programs stored in its program memory 105. The computer 20 area 303 is added to the computer 10 area for delivery to the transmission line 1. FIG. 5 schematically shows the above procedure. The other computers perform the similar formation and addition of the computer areas 302 to 304 to thereby complete a program train 300. The computer, which first delivered the program train, receives the completed program train 300, compares the program content code 308 and the cooperation code 309 of the newly stored program with those of other programs to check if the cooperation contents of programs to be used do not contradict each other. If contradictory, the execution of this program is inhibited and a message to such effect is sent to the transmission line 1 or the terminal equipment 11. If not contradictory, the program holds an executable status.

Figure 6:
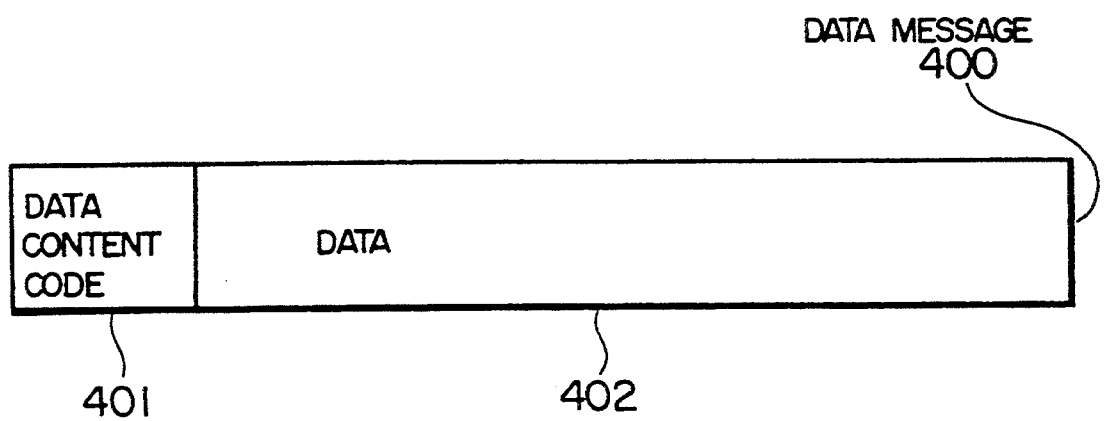
FIG. 6 shows a data message format.

The executable program is executed if data indicated by the input content code 204 of the program is present. The data may previously be stored in the data memory 106, or may later be taken from the transmission line 1 and stored in the memory 106. The data is transmitted in the format of a data message 400 shown in FIG. 6. The data message is constructed of data itself 402 and a data content code 401 representative of the content of the data. The data content code is compared with the input content code 204 of the program and the program is executed when a coincidence therebetween is assured.

The executed program produces, at the end of its run, output data as well as a predetermined output content code representative of the output data. The output content code is compared with the output content code 205 of the program. If the produced output content code is included in the predetermined output content code 205, it is judged that the program has been correctly executed, and the output data is stored in the data memory 106, or if desired, delivered to the transmission line 1 via the output buffer 104 and the interface 101 for input to other computers. Alternatively, if the produced output content code is not included in the predetermined output content code 205, then it is judged that the program has a fault, and a message to such effect is delivered to the terminal equipment 11 or the transmission line 1.

Each computer receives a new program, a corrected program, an improved program, or an altered program, one after another via the transmission line 1 or the terminal equipment 11. To this end, a known program development supporting system is provided for each computer for procedures of interchange, addition, conversion, edition, deletion and the like of the programs. The memory management table 108 is updated if necessary during such procedures. Further, each time such procedures are conducted, fault of the program as well as compatibility of the program with other programs, is checked.

When a message, indicating that the received program has a fault or contradiction of cooperation, is delivered to the transmission line 1, the originating computer of the program analyzes the message to confirm the fault of the program. Depending upon the content of the message such as a fault, the originating computer re-transmits the program, or other wise display a necessary indication on the terminal equipment to urge the correction or re-development of the program.

Instead of separately providing the input buffer 103 and the output buffer 104, a single buffer for input/output use may be provided. Also, the program memory 105 and the data memory 106 may use different areas in a single memory.

According to the present invention, programs are not fixedly assigned to particular computers, but are transferred between computers as occasion arises or if necessary, and are checked and executed at destinations. Consequently, not only the overall processing capability of the system is improved, but also the transparency among computers for utilizing the programs between computers becomes easy. Further, improved compatibility and flexibility of the system allows an easy addition, removal, or replacement of computers thereby remarkedly improving the capability of dealing with abnormal situations of the system. Furthermore, the program management becomes easy and the productivity is improved.

We claim:

1. A method of managing programs in a multiple computer system having a plurality of computers interconnected via a transmission path, each computer having a processor and at least a memory for storing data necessary for execution of a program and programs to be executed in said processor, said method of managing programs comprising the steps of:

sending from a computer a program along with a characteristic code representing the characteristic of said program onto said transmission path, said characteristic code including a program content code representing the content of said program;

receiving in at least one computer of the other computers said program if said at least one computer decides to receive said program on the basis of said characteristic code and storing said program in said memory of said at least one computer;

sending from a computer data and a content code representing the content of said data onto said transmission path;

receiving in said at least one computer said data if said at least one computer decides to receive said data on the basis of said content code indicating that said data is necessary for execution of said program and storing said data in said memory of said at least one computer; and executing said program stored in said memory of said at least one computer, using said data, when said data necessary for the execution of said program is available.

2. A method of program management according to claim 1, wherein said characteristic code includes said program content code representative of the content of said program, and said other computers have a content code table representative of the content of a program to be received, and said receiving step includes a step of checking said program content code with the content of said content code table.

3. A method of program management according to claim 2, wherein said characteristic code further includes a length code indicating the length of said program, said other computers have a memory management table representative of an unused area of its memory, and said program receiving step further includes a step of checking said length code with the content of said memory management table thereby indicating whether said program will fit in said unused area.

4. A method of managing programs according to claim 1, wherein a content code representing the content of said data is sent with said data onto said transmission path and said data is received in at least on computer if it decides to receive said data.

5. A method of managing programs according to claim 4, wherein said characteristic code includes said program content code representative of the content of said program, and said other computers have a content code table representative of the content of a program to be received, and said program receiving step includes a step of checking said program content code with the content of said content code table.

6. A method of managing programs according to claim 5, wherein said characteristic code further includes a length code indicating the length of said program, said other computers have a memory management table representative of an unused area of its memory, and said program receiving step further includes a step of checking said length code with the content of said memory management.

7. A method of managing programs in a multiple computer system having a plurality of computers interconnected via a transmission path, each computer having a processor and at least a memory for storing data necessary for execution of a program and programs to be executed, said method of managing programs comprising the steps of:

sending from a computer a program along with a characteristic code representing the characteristic of said program onto said transmission path, said characteristic code including a program content code representing the content of said program and a control code representing control characteristics of said program;

receiving in at least one computer of the other computers said program if said at least one computer decides to receive said program on the basis of said program content code of said characteristic code;

said program receiving step includes the steps of checking said program, at said at least one computer of the other computers having received said program, based on said control code of said characteristic code, and storing said program into said memory of said at least one computer after being checked by said checking step;

sending from a computer data and a content code representing the content of said data onto said transmission path;

receiving in said at least one computer said data if said at least one computer decides to receive said data on the basis of said content code indicating said data is necessary for execution of said program and storing said data in said memory of said at least one computer; and executing said program stored in said memory of said at least one computer, using said data, when said data necessary for the execution of said program is available.

8. A method of program management according to claim 7, wherein said control code includes simulation input and output data for use with said program in determining whether said program has a fault, and said checking step further includes a step of checking if said program has a fault by causing said program to execute said simulation input data thereby generating output data which is compared to said simulation output data.

9. A method of managing programs according to claim 7, wherein a content code representing the content of said data is sent with said data onto said transmission path and said data is received in at least one computer if it decides to receive said data.

10. A method of managing programs according to claim 9, wherein said control code includes simulation input and output data for use with said program in determining whether said program has a fault, and said checking step further includes a step of checking if said program has a fault by causing said program to execute said simulation input data thereby generating output data which is compared to said simulation output data.

11. A method of managing programs in a multiple computer system having a plurality of computers interconnected via a transmission path, each computer having a processor and at least a memory for storing data necessary for execution of a program and programs to be executed, said method of managing programs comprising the steps of:

sending from a computer data and a content code representing the content of said data onto said transmission path;

receiving, in at least one computer of the other computers, said data if said at least one computer decides to receive said data on the basis of said content code and storing said data in said memory of said at least one computer;

sending from a computer a program along with a characteristic code representing the characteristic of said program onto said transmission path, said characteristic code including a program content code representing the content of said program and a control code representing control characteristics of said program;

receiving in at least one computer of the other computers said delivered program if said at least one computer decides to receive said delivered program on the basis of said program content code of said characteristic code;

said program receiving step includes the steps of checking said delivered program, at said at least one computer of the other computers having received said delivered program, based on said control code of said characteristic code, and storing said program into said memory of said at least one computer after being checked by said checking step;

executing said program stored in said memory of said at least one computer when data necessary for the execution of said program is available;

storing in each memory of each computer characteristic codes corresponding to said programs stored in said memory, wherein each characteristic code represents the characteristic of a corresponding program and said characteristic code includes a program content code representing the content of said corresponding program and a control code representing control characteristics of said corresponding program, and wherein said control includes a cooperation code indicating the type of cooperation to be instituted between said corresponding program and other programs of said other computers; and said checking step further includes the steps of:
collecting at least said cooperation codes in said control codes of other programs stored in said memories of the other computers; and
comparing the cooperation code of said delivered program with the cooperation codes collected from the other computers, thereby checking whether said delivered program contradicts said other programs stored in the memories of the other computers.

12. A method of managing programs in a multiple computer system having a plurality of computers interconnected via a transmission path, each computer having a processor and at least a memory for storing data necessary for execution of a program and programs to be executed, said method of managing programs comprising the steps of:

sending from a computer a program to be executed along with a characteristic code representing the characteristic of said program to other computers through said transmission path;

receiving in at least one computer of said other computers said program on the basis of said characteristic code;

sending from a computer data and a content code representing the content of said data onto said transmission path;

receiving in said at least one computer said data if said at least one computer decides to receive said data on the basis of said content code indicating said data is necessary for execution of said program and storing said data in said memory of said at least one computer; and executing said program stored in said memory of said at least one computer, using said data, when said data necessary for the execution of said program is available.

13. A method of program management according to claim 12, wherein said characteristic code includes a code corresponding to at least one condition for running the program.

14. A method of program management according to claim 1 or 12, wherein said characteristic code includes an input content code representing the content of input data for executing said program, said received program in said at least one computer is executed when data, corresponding to the input content code of said characteristic code, is available.

15. A method of program management according to claim 14:
wherein said characteristic code further includes an output content code representing the content of data to be obtained as a result of executing said program; and
wherein said method further includes a step of comparing an output content code representing the content of data to be obtained as a result of execution of the received program to data output as the result of execution of the received program to judge whether the received program is correctly executed.

16. A method of managing programs according to claim 12, wherein a content code representing the content of said data is sent with said data onto said transmission path and said data is received in at least one computer if it decides to receive said data.

17. A method of managing programs according to claim 16, wherein said characteristic code includes a code corresponding to at least one condition for running the program.

18. A method of managing programs according to claim 4 or 16, wherein said characteristic code includes an input content code representing the content of input data for executing said program, said received program in said at least one computer is executed when data, corresponding to the input content code of said characteristic code, is available.

19. A method of managing programs according to claim 18, wherein said characteristic code further includes an output content code representing the content of data to be obtained as a result of executing said program; and
wherein said method further includes a step of comparing an output content code representing the content of data to be obtained as a result of execution of the received program to data output as the result of execution of the received program to judge whether the received program is correctly executed.

20. A method of managing programs in a multiple computer system having a plurality of computers interconnected via a transmission path, each computer having a processor and a memory for storing data necessary for execution of a program and programs to be executed, said method of managing programs comprising the steps of:

sending from a computer a message including a program, a first code representing the characteristic of said program and a second code corresponding to at least one condition for running said program;

receiving in at least one computer of said other computers said program and said second code when said at least one computer decides to receive said program and said second code on the basis of said first code;

sending from a computer data and a content code representing the content of said data onto said transmission path;

receiving in said at least one computer said data if said at least one computer decides to receive said data on the basis of said content code indicating said data is necessary for execution of said program and storing said data in said memory of said at least one computer; and executing said program received at said at least one computer, using said data, when said data necessary for the execution of said program is available.

21. A method of program management according to claim 20, wherein said second code includes an input content code representing the content of input data for executing in said program, said received program in said at least one computer is executed when data, corresponding to the input content code of said characteristic code, is available.

22. A method of program management according to claim 21, wherein said message further includes an output content code representing the content of data to be obtained as result of executing said program; and wherein said method further includes a step of comparing an output content code representing the content of data to be obtained as a result of execution of the received program to data output as the result of execution of the received program to judge whether the received program is correctly executed.

23. A method of managing programs according to claim 20, wherein a content code representing the content of said data is sent with said data onto said transmission path and said data is received in at least one computer if it decides to receive said data.

24. A method of managing programs according to claim 23, wherein said second code includes an input code representing the content of input data for executing said program, said received program in said east one computer is executed when data, corresponding to the input content code of said characteristic code, is available.

25. A method of managing programs according to claim 24, wherein the message further includes an output content code representing the content of data to be obtained as a result of executing said program; and wherein said method further includes a step of comparing an output content code representing the content of data to be obtained as a result of execution of the received program to data output as the result of execution of the received program to judge whether the received program is correctly executed.

26. A method of managing programs in a multiple computer system having a plurality of computers interconnected via a transmission path, each computer having a processor and a memory for storing data necessary for execution of a program and programs to be executed, said method of managing programs comprising the steps of:

sending from a first computer a program train code, an identifier of said first computer, a program content code representing the content of programs stored in said memory of said first computer and said programs stored in said memory of said first computer;

receiving in a succeeding computer the program train code from the first computer and an identifier, a program content code and said programs from each computer preceding said succeeding computer including said first computer;

sending from said succeeding computer an identifier of said succeeding computer, a program content code representing the content of programs stored in said memory of said succeeding computer and the programs stored in the memory of the succeeding computer along with the program train code of the first computer and, an identifier, a program content code and the programs from each computer preceding the succeeding computer including the first computer, thereby forming a train of programs;

receiving in said first computer said train of programs; and determining in said first computer whether said programs of said train of programs cooperate with each other without error.

27. A method of program management according to claim 26, wherein said train of programs include cooperation codes of the respective programs and said determining step includes a step of checking whether the cooperation codes of programs corresponds to each other.

28. A method of managing programs in a multiple computer system having a plurality of computers interconnected via a transmission path, each computer having a processor and at least a memory for storing data necessary for execution of a program and programs to be executed, said method of managing programs comprising the steps of:

sending from a computer data and a content code representing the-content of said data onto said transmission path;

receiving, in at least one computer of the other computers, said data if said at least one computer decides to receive said data on the basis of said content code and storing said data in said memory of said at least one computer;

sending from a computer a program along with a characteristic code representing the characteristic of said program onto said transmission path, said characteristic code including a program content code representing the content of said program and a control code representing control characteristics of said program;

receiving in at least one computer of the other computers said delivered program if said at least one computer decides to receive said delivered program on the basis of said program content code of said characteristic code;

said program receiving step includes the steps of checking said delivered program, at said at least one computer of the other computers having received said delivered program, based on said control code of said characteristic code, and storing said program into said memory of said at least one computer after being checked by said checking step;

executing said program stored in said memory of said at least one computer when data necessary for the execution of said program is available;

wherein said content code representing the content of said data is sent with said data onto said transmission path and said data is received in at least one computer if it decides to receive said data;

storing in each memory of each computer characteristic code corresponding to said programs stored in said memory, wherein each characteristic code represents the characteristic of a corresponding program and said characteristic code includes a program content code representing the content of said corresponding program and a control code representing control characteristics of said corresponding program, wherein said control code includes a cooperation code indicating a type of cooperation to be instituted between said corresponding program and other programs of said other computers; and said checking step further includes the steps of:
  collecting at least said cooperation codes in said control codes of programs stored in said memories of the other computers having received said delivered program; and
  comparing the cooperation code of said delivered program with the cooperation codes collected from the other computers having received the delivered program thereby checking whether said delivered program contradicts said programs stored in the memories of the other computers having received said delivered program.

29. A method of managing programs in a multiple computer system having a plurality of computers interconnected via a transmission path, each computer having a processor and at least a memory for storing data necessary for execution of programs and programs to be executed in said processor, said method of managing programs comprising the steps of:

sending from a computer data and a content code representing the content of said data onto to said transmission path;

receiving, in at least one computer of the other computers, said data if said at least one computer decides to receive said data on the basis of said content code and storing said data in said memory of said at least one computer;

sending from a computer a program and a characteristic code representing the characteristic of said program onto said transmission path, said characteristic code including a program content code representing the content of said program;

receiving, in at least one computer or the other computers, said delivered program if said at least one computer decides to receive said delivered program on the basis of said characteristic code and storing said delivered program in said memory of said at least one computer; and executing said delivered program stored in said memory of said at least one computer when data necessary for the execution of said program is available.

30. A method of managing programs in a multiple computer system having a plurality of computers interconnected via a transmission path, each computer having a processor and at least a memory for storing programs to be executed in said processor, said method of managing programs comprising the steps of:

sending from a computer a program along with a characteristic code representing the characteristic of said program onto said transmission path, said characteristic code including a program content code representing the content of said program;

receiving in at least one computer of the other computers said delivered program if said at least one computer decides to receive said delivered program on the basis of said characteristic code and storing said delivered program in said memory of said at least one computer; and executing said delivered program stored in said memory of said at least one computer when data necessary for the execution of said program is available.

31. A method of managing programs in a multiple computer system having a plurality of computers interconnected via a transmission path, each computer having a processor and at least a memory for storing programs to be executed, said method of managing programs comprising the steps of:

sending from a computer a program along with a characteristic code representing the characteristic of said program onto said transmission path, said characteristic code including a program content code representing the content of said program and a control code representing control characteristics of said program;

receiving in at least one computer of the other computers said delivered program if said at least one computer decides to receive said delivered program on the basis of said program content code of said characteristic code;

said program receiving step includes the steps of checking said delivered program, at the other computers having received said delivered program, based on said control code of said characteristic code, and storing said program into said memory of said at least one computer after being checked by said checking step; and executing said program stored in said memory of said at least one computer when data necessary for the execution of said program is available.

32. A method of managing programs in a multiple computer system having a plurality of computers interconnected via a transmission path, each computer having a processor and at least a memory for storing programs to be executed in said processor, said method of managing programs comprising the steps of:

sending from a computer a program to be executed along with a characteristic code representing the characteristic of said program to other computers through said transmission path;

receiving in at least one computer of said other computers said delivered program on the basis of said characteristic code; and executing said received program in said at least one computer when data necessary for the execution of said program is available.

33. A method of managing programs in a multiple computer system having a plurality of computers interconnected via a transmission path, each computer having a processor and a memory for storing programs to be executed, said method of managing programs comprising the steps of:

sending from a computer a message including a program, a first code representing the characteristic of said program and a second code corresponding to at least one condition for running said program;

receiving in at least one computer of said other computers said program and said second code when said at least one computer decides to receive said program and said second code on the basis of said first code; and executing said received program at said at least one computer when data necessary for the execution of said program is available.

34. A method of managing programs in a multiple computer system having a plurality of computers interconnected via a transmission path, each computer having a processor and a memory for storing programs to be executed, said method of managing programs comprising the steps of:

sending from a first computer a program train code, an identifier of said first computer, a program content code representing the content of programs stored in said memory of said first computer and said programs stored in said memory of said first computer;

receiving in a succeeding computer the program train code from the first computer and an identifier, a program content code and said programs from each computer preceding said succeeding computer including said first computer;

sending from said succeeding computer an identifier of said succeeding computer, a program content code representing the content of programs stored in said memory of said succeeding computer and the programs stored in the memory of the succeeding computer along with the program train code of the first computer and, an identifier, a program content code and the programs from each computer preceding the succeeding computer including the first computer, thereby forming a train of programs;

receiving in said first computer said train of programs; and determining in said first computer whether said programs of said train of programs cooperate with each other without error.

35. A method of managing programs in a multiple computer system having a plurality of computers interconnected via a transmission path, each computer having a processor and at least a memory for storing data necessary for execution of programs and programs to be executed in said processor, said method of managing programs comprising steps of:

sending from a first computer of said computers a program train comprising a program train code indicative of a program train, first control code and first program onto said transmission path, said first control code including a first cooperation code indicative of at least one cooperation state selected from a group comprising synchronizations between an execution of said first program and executions of other programs in other computers, and matching between data output from said first computer and data output from other computers;

receiving said program train in at least a second computer of said other computers, adding to said program train a second control code and a second program of said second computer, and sending said added program train onto said transmission path, said second control code including second cooperation code indicative of at least one cooperation state selected from a group comprising synchronizations between an execution of said second program and executions of other programs in other computers, and matching between data output from said second computer and data output from other computers; and receiving said added program train in said first computer, checking a consistency among said cooperation codes included in said added program train, and executing said programs included in said program train.

\* \* \* \* \*